(12) United States Patent
Chen (10) Patent No.: US 8,622,595 B2
(45) Date of Patent: Jan. 7, 2014

(54) BICYCLE BRAKE LIGHT CONTROLLING ASSEMBLY

(76) Inventor: Pao-Liang Chen, Taichung (TW)

(*) Notice: Subject to any disclaimer, the term of this patent is extended or adjusted under 35 U.S.C. 154(b) by 133 days.

(21) Appl. No.: 13/413,348

(22) Filed: Mar. 6, 2012

(65) Prior Publication Data

US 2013/0235602 A1    Sep. 12, 2013

(51) Int. Cl.
*B62J 6/00* (2006.01)
*F21V 33/00* (2006.01)
*B60Q 1/26* (2006.01)
*B62J 3/00* (2006.01)

(52) U.S. Cl.
USPC ........... 362/473; 362/474; 362/540; 362/541; 340/432

(58) Field of Classification Search
USPC ................. 362/473, 474, 540, 541, 190, 191; 340/432; 315/77, 78
See application file for complete search history.

(56) References Cited

U.S. PATENT DOCUMENTS

| | | | | |
|---|---|---|---|---|
| 5,689,232 A * | 11/1997 | O'Shaughnessy et al. | ... | 340/468 |
| 7,760,078 B2 * | 7/2010 | Miki et al. | ..... | 340/432 |
| 7,852,204 B2 * | 12/2010 | Lai | ..... | 340/475 |
| 2008/0088423 A1 * | 4/2008 | Liu | ..... | 340/432 |

* cited by examiner

*Primary Examiner* — Jong-Suk (James) Lee
*Assistant Examiner* — Erin Kryukova
(74) *Attorney, Agent, or Firm* — Ming Chow; Sinorica, LLC (57) ABSTRACT

A bicycle brake light controlling assembly has a lamp device, a controller device and a trigger device. The lamp device has a brake light and a wireless receiving unit. The controller device is capable of wirelessly emitting a controlling signal to the lamp device and has a wireless emitting unit. The trigger device is electrically connected with the controller device and is capable of being mounted securely on a brake lever of a bicycle.

8 Claims, 8 Drawing Sheets

BICYCLE BRAKE LIGHT CONTROLLING ASSEMBLY

BACKGROUND OF THE INVENTION

1. Field of the Invention

The present invention relates to a bicycle brake light controlling assembly, and more particularly to a bicycle brake light controlling assembly that quickly and conveniently activates a flash light with one act.

2. Description of Related Art

A conventional bicycle brake light controlling assembly has a lamp device and a controller device. The lamp device is mounted securely on a seat bracket of a bicycle and has a brake light. The controller device is mounted securely on a handle bar of the bicycle, is electrically connected with the lamp device and has a brake button. When the brake button is pressed, the brake light flashes.

However, a bicycle rider has to press both of the brake button and a brake lever when the rider wants to brake. Two acts of pressing are required and this is inconvenient.

To overcome the shortcomings, the present invention tends to provide a bicycle brake light controlling assembly to mitigate the aforementioned problems.

SUMMARY OF THE INVENTION

The main objective of the invention is to provide a bicycle brake light controlling assembly that quickly and conveniently activates a flash light with one act.

A bicycle brake light controlling assembly has a lamp device, a controller device and a trigger device. The lamp device has a brake light and a wireless receiving unit. The controller device is capable of wirelessly emitting a controlling signal to the lamp device and has a wireless emitting unit. The trigger device is electrically connected with the controller device and is capable of being mounted securely on a brake lever of a bicycle. When the brake lever is pressed, the trigger device is simultaneously pressed and the brake light spontaneously flashes. With a single act of pressing, the brake light is activated and this is convenient for a user.

Other objects, advantages and novel features of the invention will become more apparent from the following detailed description when taken in conjunction with the accompanying drawings.

DETAILED DESCRIPTION OF PREFERRED EMBODIMENT

Figure 1:
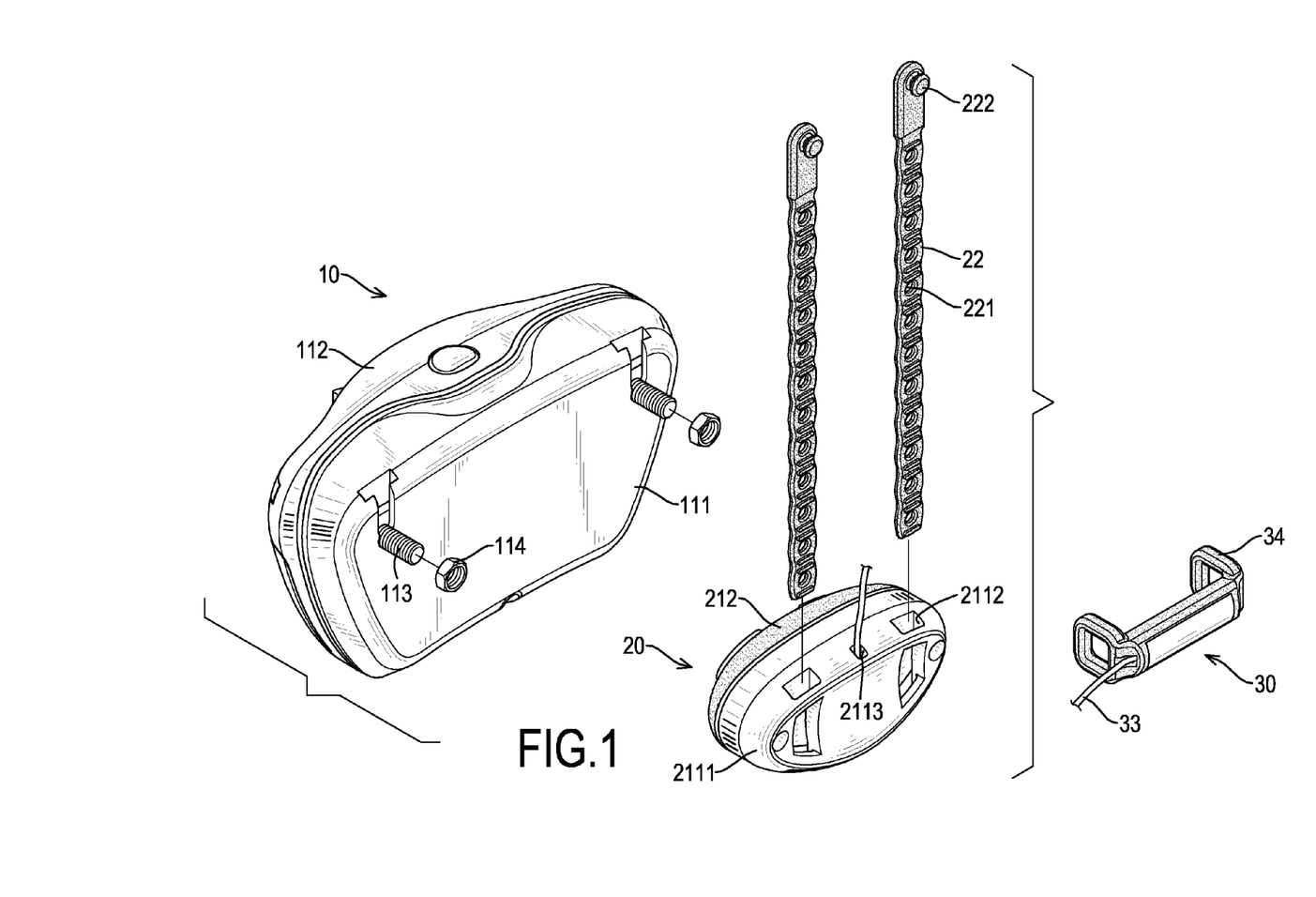
FIG. 1 is a partially exploded perspective view of a bicycle brake light controlling assembly in accordance with the present invention.
Figure 2:
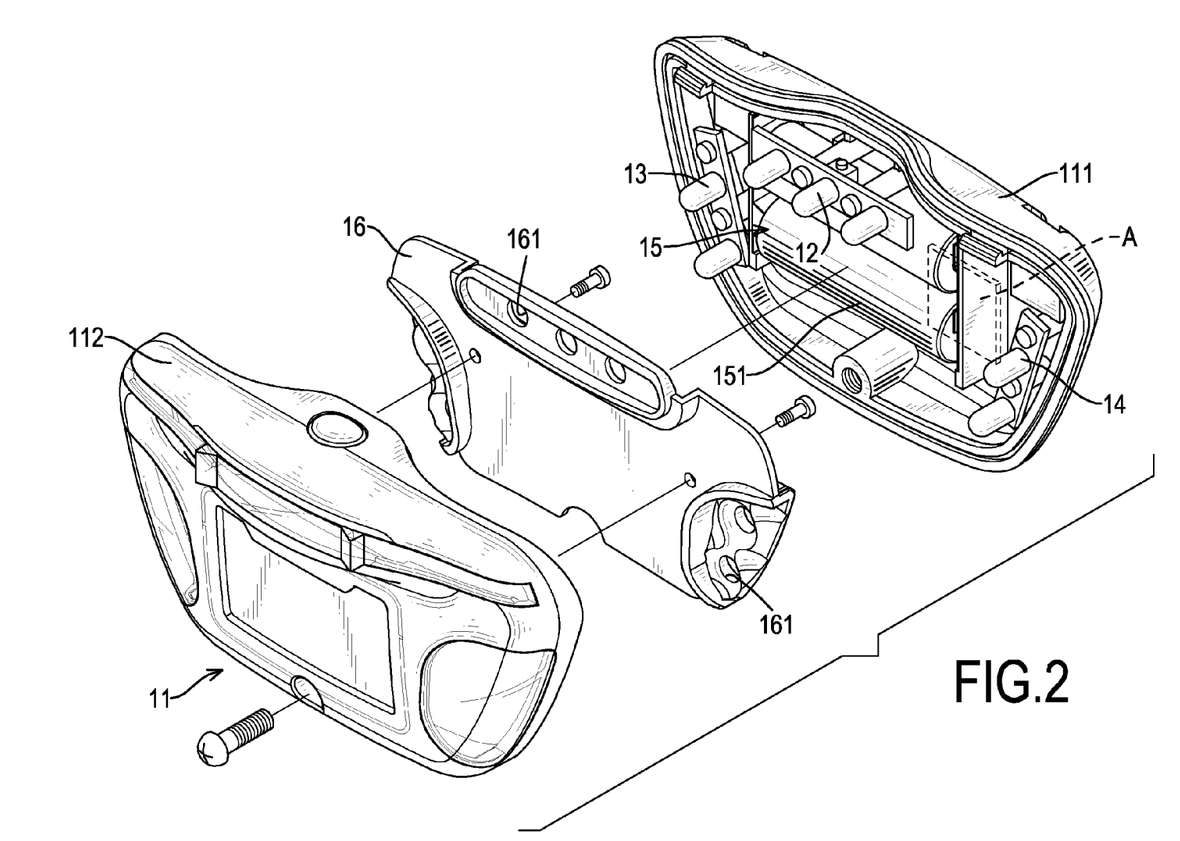
FIG. 2 is a partially exploded and enlarged perspective view of a lamp device of the bicycle brake light controlling assembly in FIG. 1.
Figure 3:
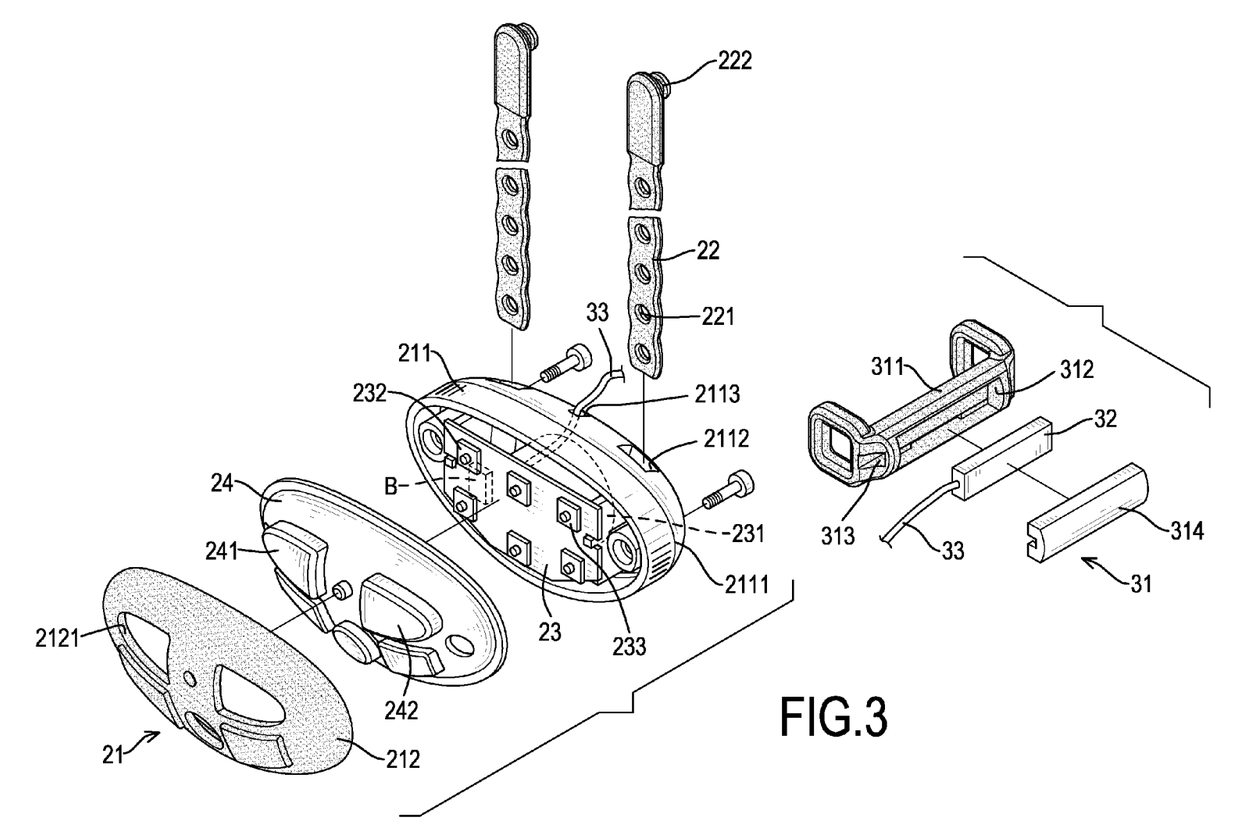
FIG. 3 is a partially exploded perspective view of the bicycle brake light controlling assembly in FIG. 1 showing a controller device and a trigger device.

With reference to FIGS. 1 to 3, a bicycle brake light controlling assembly in accordance with the present invention comprises a lamp device 10, a controller device 20 and a trigger device 30.

The lamp device 10 has a lamp housing 11, a brake light 12, a left turn light 13, a right turn light 14, a circuit unit 15 and a mounting plate 16.

The lamp housing 11 has a first side, a second side, a housing bracket 111, a housing cover 112, an inner space and a connecting structure. The second side of the lamp housing 11 is opposite to the first side of the lamp housing 11. The housing bracket 111 is hollow and has an opening and a side. The side of the housing bracket 111 is opposite to the opening of the housing bracket 111 and serves as the second side of the lamp housing 11.

The housing cover 112 is mounted securely in the opening of the housing bracket 111, is light-pervious and is formed at the first side of the lamp housing 11.

The inner space of the lamp housing 11 is formed inside the lamp housing 11 between the housing bracket 111 and the housing cover 112. The inner space of the lamp housing 11 has a central area, two opposite sides and a top area.

The connecting structure is mounted at the second side of the lamp housing 11 to connect the lamp device 10 to the seat bracket of the bicycle and may comprise two bolts 113 and two nuts 114. The bolts 113 protrude from the second side of the lamp housing 11. The nuts 114 are respectively mounted around the bolts 113.

The brake light 12 is mounted inside the lamp housing 11 and is located at the top area of the inner space of the lamp housing 11.

The left turn light 13 and the right turn light 14 are respectively mounted inside the lamp housing 11 and are respectively adjacent to two opposite ends of the lamp housing 11. The left turn light 13 and the right turn light 14 are respectively located at the opposite sides of the inner space of the lamp housing 11.

Figure 7:
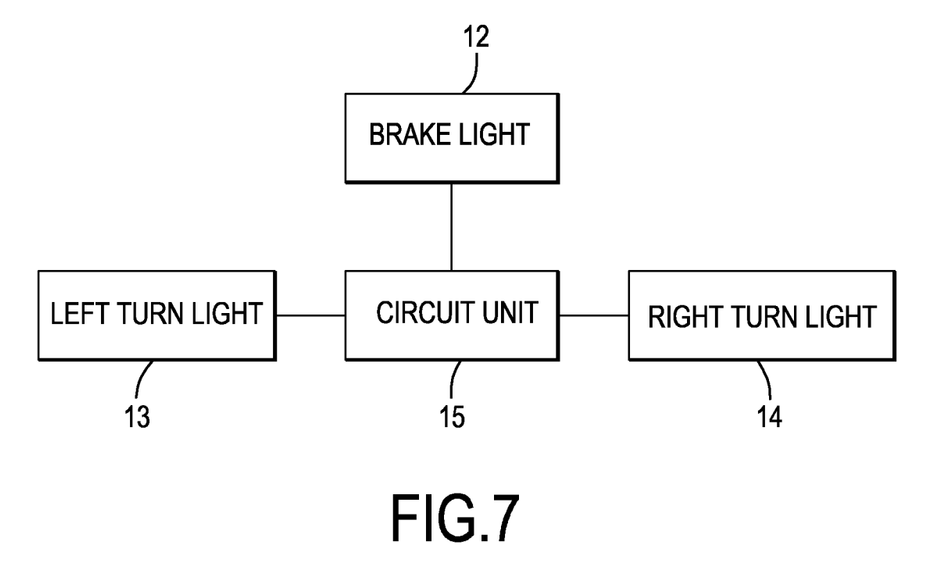
FIG. 7 is a block diagram in partial section of the lamp device of the bicycle brake light controlling assembly.

With reference to FIG. 7, the circuit unit 15 is mounted inside the lamp housing 11, is located at the central area of the inner space of the lamp housing 11 and is electrically connected with the brake light 12, the left turn light 13 and the right turn light 14. The circuit unit 15 has a lamp battery 151 and a wireless receiving unit A.

The mounting plate 16 is mounted inside the lamp housing 11 and has multiple light holes 161 formed through the mounting plate 16. The brake light 12, the left turn light 13 and the right turn light 14 respectively protrude out from the light holes 161.

Figure 8:
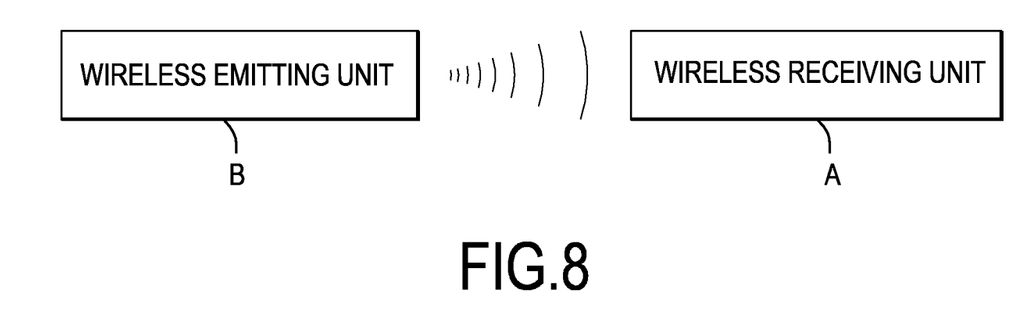
FIG. 8 is a block diagram of the bicycle brake light controlling assembly showing a relationship between the wireless receiving unit and the wireless emitting unit.

With reference to FIGS. 1, 3 and 8, the controller device 20 is capable of wirelessly emitting a controlling signal to the lamp device 10 and has a controller housing 21, two belts 22, a circuit board 23 and a pad 24.

The controller housing 21 has a connecting side. Preferably, the controller housing 21 has a shell 211 and a controller cover 212. The shell 211 has a side, an opening, a connecting section 2111, two belt holes 2112 and a cord hole 2113.

The side of the shell 211 serves as the connecting side of the controller housing 21 and is opposite to the opening of the shell 211.

The connecting section 2111 is formed on the side of the shell 211, is solid and has a top.

The belt holes 2112 are respectively and longitudinally formed through the connecting section 2111.

The cord hole 2113 is formed in the controller housing 21 at the top of the connecting section 2111.

The controller cover 212 is securely mounted in the opening of the shell 211 and has two button holes 2121 formed through the controller cover 212.

The belts 22 are respectively mounted through the belt holes 2112. Each belt 22 has an end, multiple belt apertures 221 and a belt lump 222. The belt apertures 221 of each belt 22 are formed through the belt 22. The belt lump 222 of each belt 22 protrudes from the end of the belt 22 and is capable of being inserted into one of the belt apertures 221 of the belt 22.

The connecting section 2111, the belt holes 2112 and the belts 22 are defined as a bundling structure. The bundling structure is formed on the side of the shell 211.

The circuit board 23 is mounted inside the controller housing 21, is encompassed by the shell 211 and has a first surface, a second surface, a controller battery 231, a left turn light switch 232, a right turn light switch 233 and a wireless emitting unit B.

The first surface of the circuit board 23 faces the connecting section 2111 of the shell 211.

The second surface of the circuit board 23 is opposite to the first surface of the circuit board 23, is adjacent to the opening of the shell 211 and has two opposite sides. The controller battery 231 and the wireless emitting unit B are mounted on the first surface of the circuit board 23.

The left turn light switch 232 and the right turn light switch 233 are mounted securely on the second surface of the circuit board 23 and are respectively located at the opposite sides of the second surface of the circuit board 23.

The pad 24 is elastic, is made of rubber, covers the second surface of the circuit board 23, is encompassed by the controller cover 212 and has a left turn button 241 and a right turn button 242. The left turn button 241 protrudes from the pad 24 and covers the left turn light switch 232. The right turn button 242 protrudes from the pad 24 and covers the right turn light switch 233. The left turn button 241 and the right turn button 242 respectively protrude out from the button holes 2121.

With reference to FIGS. 1 and 3, the trigger device 30 is electrically connected with the controller device 20 and has a main body 31, a brake light switch 32, a cord 33 and two bands 34.

The main body 31 is elastic, is made of rubber, is latitudinally elongated and has two opposite ends, a stand 311, a switch recess 312, a cord aperture 313 and a sealing cover 314. The stand 311 is elongated, is made of rubber and has a side and two opposite ends. The switch recess 312 is formed in the side of the stand 311 and is formed inside the main body 31. The cord aperture 313 is formed in the stand 311 of the main body 31 and communicates with the switch recess 312. The sealing cover 314 is made of rubber and is mounted securely in the switch recess 312 by adhesive.

The brake light switch 32 is mounted in the switch recess 312 and is located between the sealing cover 314 and a bottom of the switch recess 312.

The cord 33 is connected with the brake light switch 32 and the circuit board 23, and is mounted through the cord aperture 313 and the cord hole 2113.

The bands 34 are respectively and securely mounted on the ends of the stand 311 of the main body 31.

With reference to FIGS. 1, 4, 5 and 6, the bicycle brake light controlling assembly is securely mounted on a bicycle 40. With the connecting structure, the lamp device 10 can be securely connected with a seat bracket 41 of the bicycle 40. With the bundling structure, the controller device 20 can be securely mounted around a handle bar 42 of the bicycle 40. The left turn button 241 and the right turn button 242 face a seat of the bicycle 40. With the bands 34 mounted around a brake lever 43 of the bicycle, the trigger device 30 is securely mounted on the bicycle 40. The sealing cover 314 faces a front area of the bicycle 40.

Figure 4:
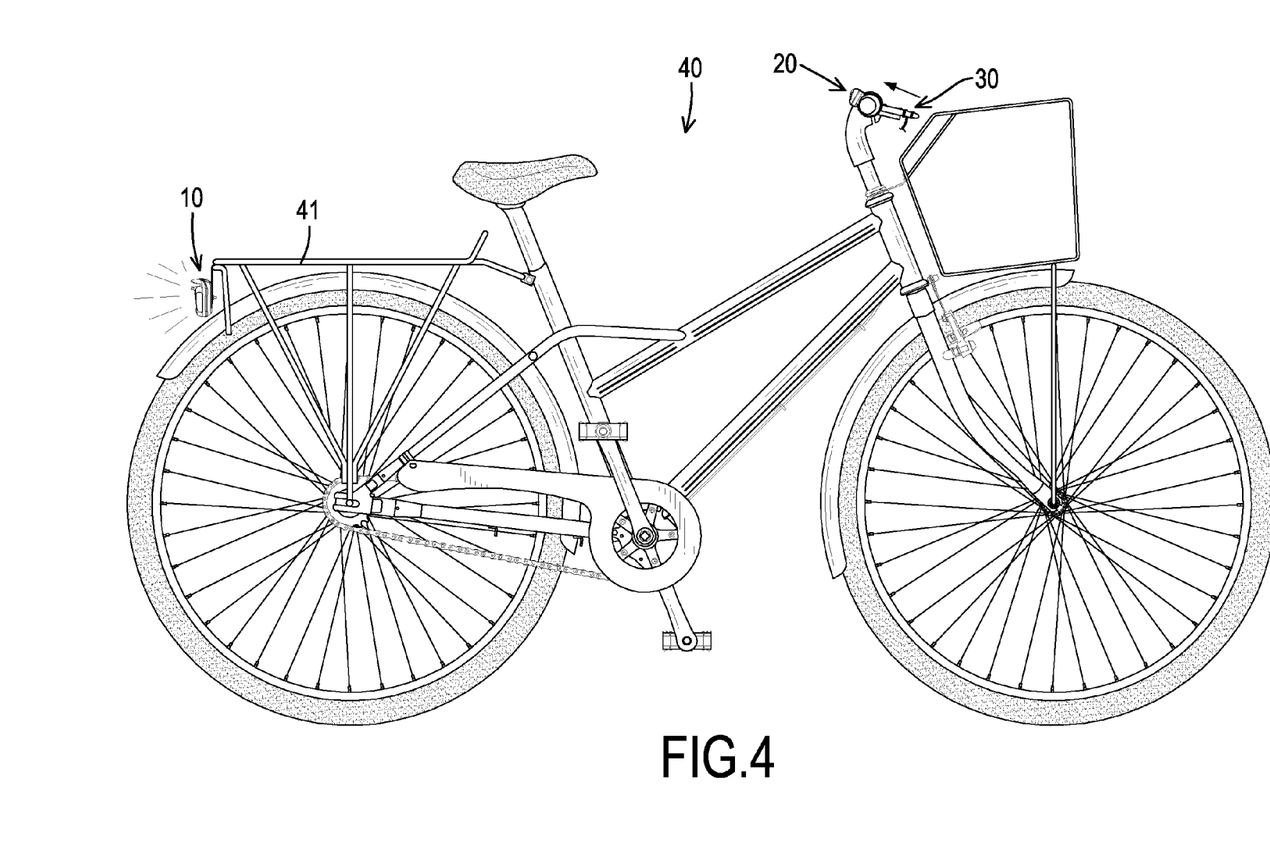
FIG. 4 is an operational side view of the bicycle brake light controlling assembly in FIG. 1, wherein the bicycle brake light controlling assembly is mounted on a bicycle.
Figure 5:
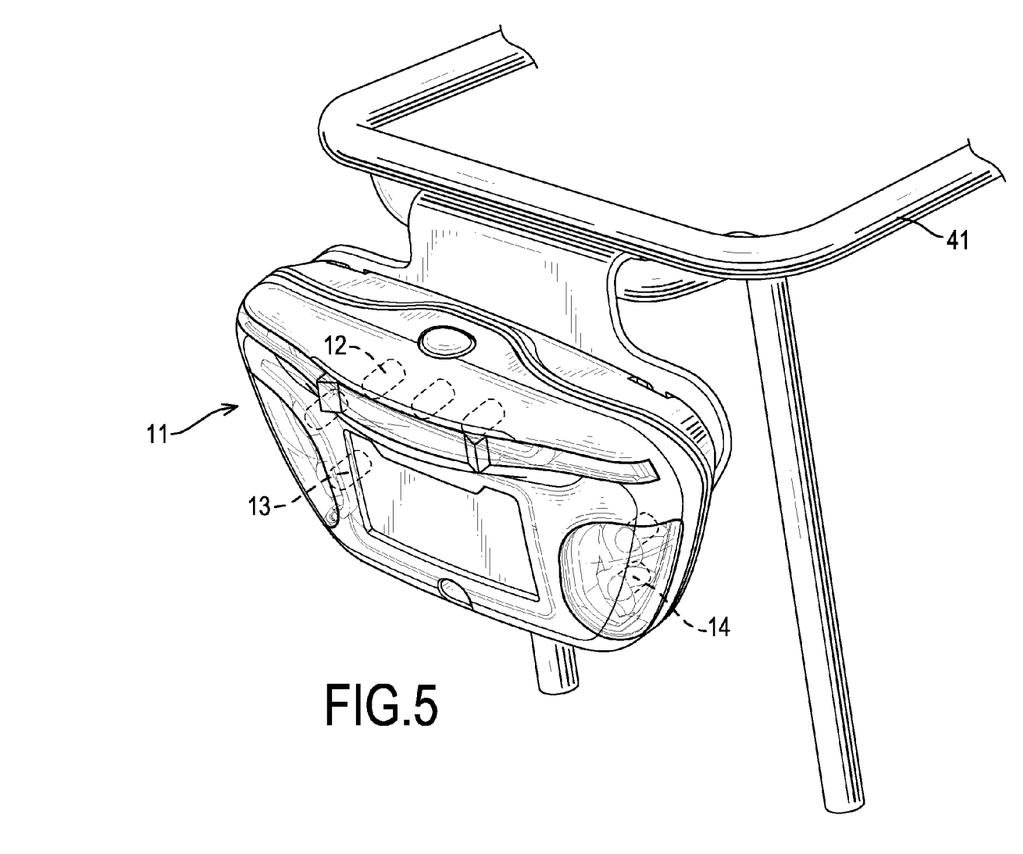
FIG. 5 is an enlarged perspective view of the bicycle brake light controlling assembly in FIG. 4 showing the lamp device.
Figure 6:
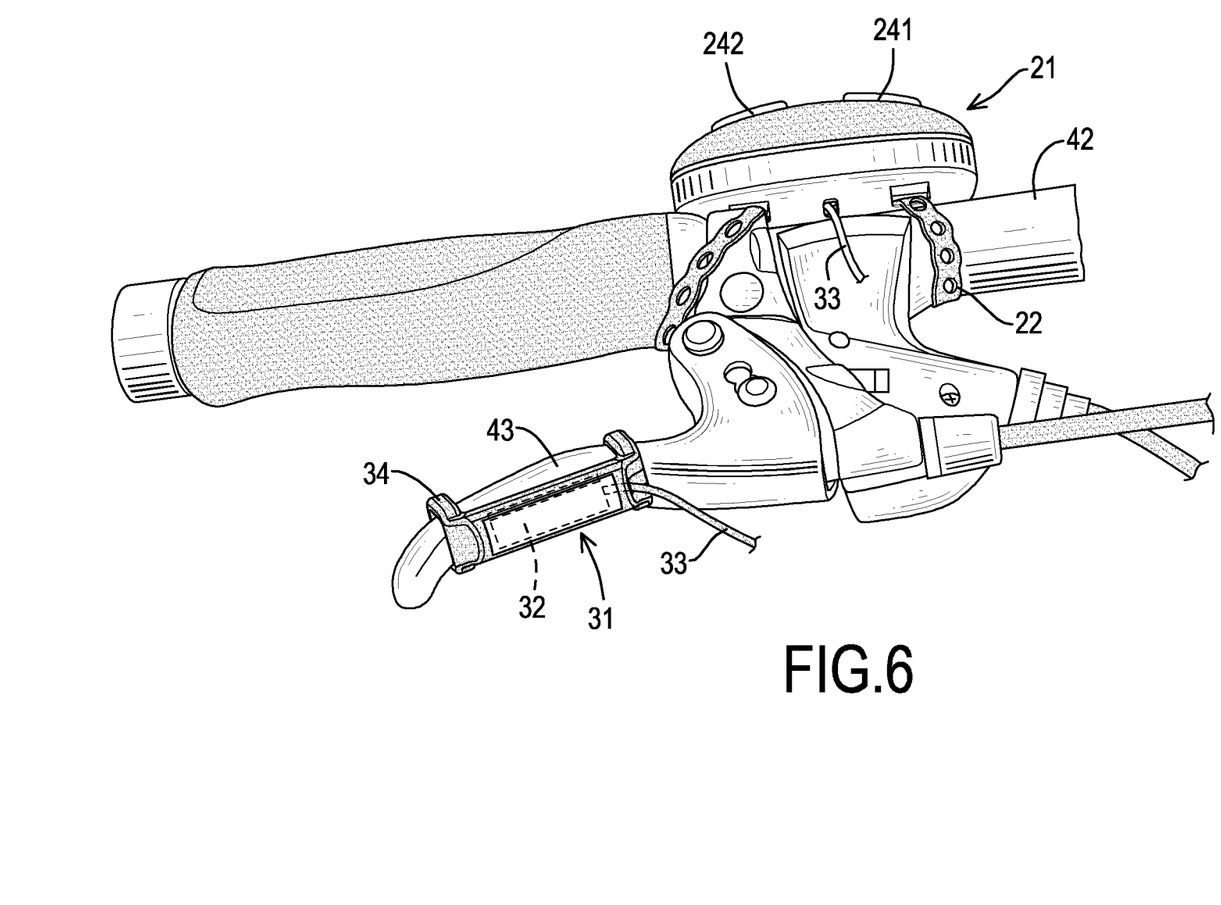
FIG. 6 is an enlarged perspective view of the bicycle brake light controlling assembly in FIG. 4 showing the controller device and the trigger device.

When a user wants to make a left turn or a right turn, the left turn button 241 or the right turn button 242 is pressed. Accordingly, the wireless emitting unit B of the trigger device 30 emits a signal to the wireless receiving unit A of the lamp device 10. Consequently, the left turn light 13 or the right turn light 14 flashes.

When the user wants to brake and stop the bicycle 40, the brake lever 43 is pressed to pivot backwardly. Accordingly, the sealing cover 314 and the brake light switch 32 are pressed. With the cord 33 connected with the brake light switch 32 and the circuit board 23, the brake light switch 32 activates the wireless emitting unit B. Consequently, the wireless emitting unit B emits a signal to the wireless receiving unit A and the brake light 12 flashes.

From the above description, it is noted that the present invention has the following advantage:

When the brake lever 43 is pressed, the trigger device 30 is simultaneously pressed and the brake light 12 spontaneously flashes. With a single act of pressing, the brake light 12 is activated and this is convenient in operation.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bicycle brake light controlling assembly comprising:
   a lamp device having
      a lamp housing having
         a first side;
         a second side opposite to the first side of the lamp housing;
         a light-pervious housing cover formed at the first side of the lamp housing; and
         a connecting structure formed at the second side of the lamp housing;
      a brake light mounted inside the lamp housing; and
      a circuit unit mounted inside the lamp housing, electrically connected with the brake light and having
         a lamp battery; and
         a wireless receiving unit;
   a controller device capable of wirelessly emitting a controlling signal to the lamp device and having
      a controller housing having
         a connecting side;
         a bundling structure formed at the connecting side of the controller housing; and
         a cord hole formed in the controller housing; and
      a circuit board mounted inside the controller housing and having a controller battery and a wireless emitting unit, wherein the wireless emitting unit is capable of emitting a signal to the wireless receiving unit; and
   a trigger device electrically connected with the controller device and having
      an elastic and elongated main body having two opposite ends;
a switch recess formed inside the main body; and
a cord aperture formed in the main body and communicating with the switch recess;
a brake light switch mounted in the switch recess;
a cord connected with the brake light switch and the circuit board and mounted through the cord aperture and the cord hole; and
two bands respectively mounted securely on the ends of the main body.

2. The bicycle brake light controlling assembly as claimed in claim 1, wherein
the main body has
an elongated stand made of rubber and having a side and two opposite ends, wherein the switch recess is formed in the side of the stand and the cord aperture is formed in the stand; and
a sealing cover made of rubber and mounted securely in the switch recess, wherein the brake light switch is located between the sealing cover and a bottom of the switch recess; and
the bands are respectively mounted on the ends of the stand.

3. The bicycle brake light controlling assembly as claimed in claim 1, wherein
the lamp device has
a left turn light electrically connected with the circuit unit; and
a right turn light electrically connected with the circuit unit, wherein the left turn light and the right turn light are respectively mounted inside the lamp housing and respectively adjacent to two opposite ends of the lamp housing;
the circuit board has
a first surface on which the controller battery and the wireless emitting unit are mounted;
a second surface opposite to the first surface of the circuit board and having two opposite sides;
a left turn light switch mounted securely on the second surface of the circuit board; and
a right turn light switch mounted securely on the second surface of the circuit board, wherein the left turn light switch and the right turn light switch are respectively located at the opposite sides of the second surface of the circuit board;
the controller device further has an elastic pad covering the second surface of the circuit board and having
a left turn button protruding from the pad and covering the left turn light switch; and
a right turn button protruding from the pad and covering the right turn light switch; and
the controller housing has
a controller cover encompassing the pad and having
two button holes formed through the controller cover and respectively mounted around the left turn button and the right turn button.

4. The bicycle brake light controlling assembly as claimed in claim 2, wherein
the lamp device has
a left turn light electrically connected with the circuit unit; and
a right turn light electrically connected with the circuit unit,
wherein the left turn light and the right turn light are respectively mounted inside the lamp housing and respectively adjacent to two opposite ends of the lamp housing;
the circuit board has
a first surface on which the controller battery and the wireless emitting unit are mounted;
a second surface opposite to the first surface of the circuit board and having two opposite sides;
a left turn light switch mounted securely on the second surface of the circuit board; and
a right turn light switch mounted securely on the second surface of the circuit board, wherein the left turn light switch and the right turn light switch are respectively located at the opposite sides of the second surface of the circuit board;
the controller device further has an elastic pad covering the second surface of the circuit board and having
a left turn button protruding from the pad and covering the left turn light switch; and
a right turn button protruding from the pad and covering the right turn light switch; and
the controller housing has
a controller cover encompassing the pad and having
two button holes formed through the controller cover and respectively mounted around the left turn button and the right turn button.

5. The bicycle brake light controlling assembly as claimed in claim 3, wherein
the lamp housing has
a hollow housing bracket having
an opening in which the housing cover is securely mounted;
an inner space formed inside the lamp housing and having
a central area at which the circuit unit is located;
two opposite sides, wherein the left turn light and the right turn light are respectively located at the opposite sides of the inner space of the lamp housing; and
a top area at which the brake light is located; and
the connecting structure of the lamp housing has
two bolts protruding from the second side of the lamp housing; and
two nuts respectively mounted around the bolts.

6. The bicycle brake light controlling assembly as claimed in claim 4, wherein
the lamp housing has
a hollow housing bracket having
an opening in which the housing cover is securely mounted;
an inner space formed inside the lamp housing and having
a central area at which the circuit unit is located;
two opposite sides, wherein the left turn light and the right turn light are respectively located at the opposite sides of the inner space of the lamp housing; and
a top area at which the brake light is located; and
the connecting structure of the lamp housing has
two bolts protruding from the second side of the lamp housing; and
two nuts respectively mounted around the bolts.

7. The bicycle brake light controlling assembly as claimed in claim 5, wherein
the controller housing has
a shell encompassing the circuit board and having
a side serving as the connecting side of the controller housing; and
an opening in which the controller cover is securely mounted;

the bundling structure of the controller housing is formed on the side of the shell and having
- a solid connecting section having a top in which the cord hole is formed;
- two belt holes respectively and longitudinally formed through the connecting section;
- two belts respectively mounted through the belt holes, each belt having
  - an end;
  - multiple belt apertures formed through the belt; and
  - a belt lump protruding from the end of the belt and capable of being inserted into one of the belt apertures of the belt.

8. The bicycle brake light controlling assembly as claimed in claim 6, wherein
the controller housing has
a shell encompassing the circuit board and having
a side serving as the connecting side of the controller housing; and
an opening in which the controller cover is securely mounted;
the bundling structure of the controller housing is formed on the side of the shell and having
- a solid connecting section having a top in which the cord hole is formed;
- two belt holes respectively and longitudinally formed through the connecting section;
- two belts respectively mounted through the belt holes, each belt having
  - an end;
  - multiple belt apertures formed through the belt; and
  - a belt lump protruding from the end of the belt and capable of being inserted into one of the belt apertures of the belt.

* * * * *